United States Patent [19]

Kanuma

[11] Patent Number: 4,546,450
[45] Date of Patent: Oct. 8, 1985

[54] PRIORITY DETERMINATION CIRCUIT

[75] Inventor: Akira Kanuma, Stanford, Calif.

[73] Assignee: Tokyo Shibaura Denki Kabushiki Kaisha, Japan

[21] Appl. No.: 657,457

[22] Filed: Sep. 20, 1984

Related U.S. Application Data

[63] Continuation of Ser. No. 237,250, Feb. 23, 1981.

[30] Foreign Application Priority Data

Feb. 26, 1980 [JP] Japan ............................. 55-22920

[51] Int. Cl.[4] ........................... G06F 9/46; G06F 3/04
[52] U.S. Cl. ................................. 364/900; 340/825.51
[58] Field of Search ... 364/200 MS File, 900 MS File; 340/825, 825.51

[56] References Cited

U.S. PATENT DOCUMENTS

| 3,534,339 | 10/1970 | Rosenblatt | 364/900 |
|---|---|---|---|
| 3,573,856 | 4/1971 | Best et al. | 364/200 |
| 3,629,854 | 12/1971 | Hanck et al. | 364/200 |
| 3,800,287 | 3/1974 | Albright | 364/200 |
| 3,832,692 | 8/1974 | Henzel et al. | 364/200 |
| 3,947,824 | 3/1976 | Doehle et al. | 364/900 |
| 3,967,249 | 6/1976 | Taniyama et al. | 364/900 |
| 4,106,104 | 8/1978 | Nitta et al. | 364/900 |
| 4,130,864 | 12/1978 | Schlotterer | 364/200 |
| 4,224,684 | 9/1980 | Conner et al. | 364/900 |
| 4,326,250 | 4/1982 | McCullough | 364/200 |

FOREIGN PATENT DOCUMENTS 1249762  10/1971  United Kingdom .

OTHER PUBLICATIONS

Petriu, "N-Channel Asynchronous Arbiter Resolves Resource Allocation Conflicts", Computer Design, vol. 19, No. 8, Aug. 1980.

Adams et al., "Design Motivations for Multiple Processor Microcomputer Systems", Computer Design, vol. 17, No. 3, 3/78.

Bantz et al., "Servicing Attached Devices on a Bus", IBM Tech. Discl. Bulletin, vol. 20, No. 5, 10/77.

J. Barthmaier, Intel Multibus Interfacing, Application Note, pp. 10–11, (Jan. 1979).

Primary Examiner—Eddie P. Chan
Attorney, Agent, or Firm—Finnegan, Henderson, Farabow, Garrett & Dunner

[57] ABSTRACT

In a priority assignment circuit receiving service request signals and comprising a plurality of service enable signal transmission units for transmitting a service enable signal in accordance with a priority determined by priority signals, bypass circuits are provided each for a predetermined number of service request units. Each bypass circuit is adapted to pass the service enable signal when respective service request signals are not coupled to them from service request units.

5 Claims, 11 Drawing Figures

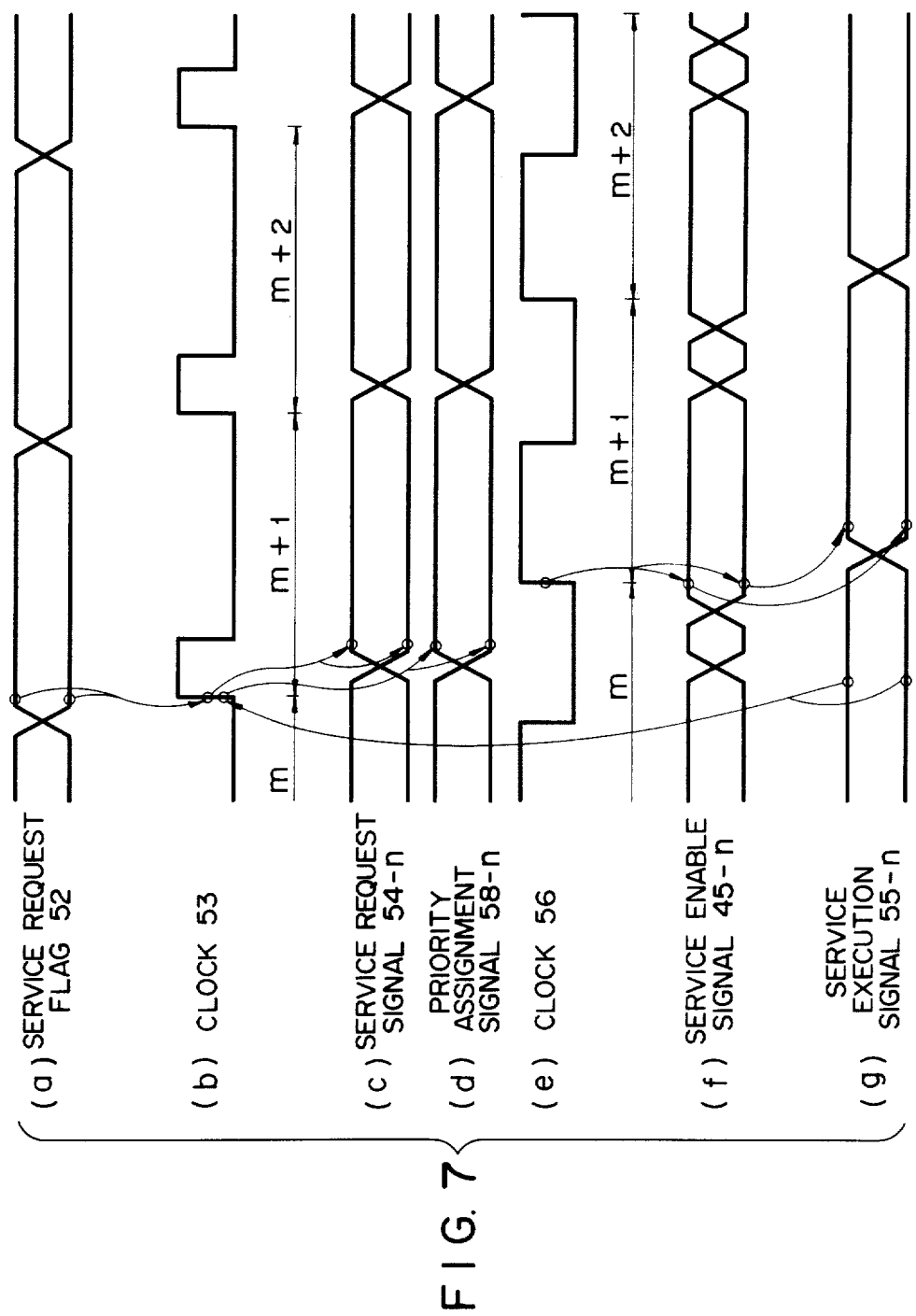

PRIORITY DETERMINATION CIRCUIT

This application is a continuation of application Ser. No. 06/237,250, filed Feb. 23, 1981.

BACKGROUND OF THE INVENTION

This invention relates to circuits for rendering a service enable signal to be assigned, in accordance with a predetermined priority, to ones of a plurality of subsystems in a system, for instance a multi-processor system, in response to service request signals from the given subsystems.

Hitherto, priority assignment circuits have been used for multi-processor systems and the like. FIG. 1 shows an example of the prior art multi-processor system. This multi-processor system comprises a system memory 1, a plurality of subsystems 2-1, 2-2, . . . , 2-n, each including a central processing unit (CPU) and a local memory, and a priority assignment circuit 3. The individual subsystems 2-1, 2-2, . . . , 2-n send respective bus requests 4-1, 4-2, . . . , 4-n as service request signals to the priority assignment circuit 3 when it is necessary to access the system memory 1 for reading or writing data. The priority assignment circuit 3 sends a service enable signal or grant signal to the individual subsystems 2-1, 2-2, . . . , 2-n in accordance with a predetermined priority.

When the service enable signal, for instance signal 5-1, is given to the subsystem 2-1, the subsystem 2-1 sends an address signal through an address bus 6 to the system memory 1, while at the same time it sends a read or write signal to a control bus 7. In case of writing data, the data to be written is sent through the data bus 8 to the system memory 1, while in the case of reading data, the desired data read out from the system memory 1 is received through the data bus 8.

If the subsystem 2-1, to which the first priority is assigned, is not providing a service request signal, the service enable signal is transmitted through a service enable signal transmission unit in the priority assignment circuit 3 to the next priority subsystem 2-2 as grant signal 5-2.

FIG. 2 shows one example of the construction of the conventional priority assignment circuit 3. This circuit is disclosed as "serial priority technique" in FIG. 8 of Intel APPLICATION NOTE AP-28A, January, 1979, page 10. In FIG. 2, the priority level is highest for the service enable signal transmission unit 11-1 at the left hand end and decreases for following units 11-2, 11-3, . . . toward the right hand. To the individual units 11-1, 11-2, . . . respective priority signals 12-1, 12-2 . . . representing the priority level and service request signals 13-1, 13-2, . . . are supplied. When the service enable signal 14-1 is coupled to the unit 11-1 of the highest priority, the unit 11-1 feeds a service enable signal of the next highest priority to the next unit 11-2 depending upon the contents of the priority signal 12-1 and service request signal 13-1. Likewise, service enable signals 14-3, 14-4, . . . of progressively lower priority are fed to the following units 11-3, 11-4, . . . from their preceding units. For example, when the priority signal 12-1 becomes "1", the service enable signal 14-2 also becomes "1" to assign the highest priority to the service request signal 13-2.

The service enable signal transmission units 11-1, 11-2, . . . which produce successive service enable signals each has a construction as shown in FIG. 3, having two NAND gate stages 21 and 22 with respect to a single service request signal line. In FIG. 3, the unit 11-1 is shown as an example. Here, the service enable signal 14-1 and an inverted service request signal $\overline{13}$-1 are coupled to the input side of the first NAND gate stage 21, and the output signal therefrom and an inverted priority signal $\overline{12}$-1 are coupled to the input side of the second NAND gate stage 22. The operation of the NAND gates 21 and 22 is well known and is not described.

With the prior art priority assignment circuit as described above, a service enable signal is produced for each service request signal line. Therefore, the period required for the transmission of the service enable signal is increased in proportion to the number of the service request signal lines. For example, where there are 16 service request signal lines, a delay time of $(16-1) \times 2Td$ is the greatest delay involved in the transmission of the service enable signal. If Td, which is the delay time per NAND gate stage, is $=9.5$ nsec., the greatest delay time in the transmission of the service enable signal is $$(16-1) \times 2 \times 9.5 \text{ nsec.} = 285 \text{ nsec.}$$

It will thus be seen that as the number of service request signal lines are increased, the efficiency of the service processing is reduced.

An object of the invention, accordingly, is to provide a priority assignment circuit which can minimize the delay due to the service enable signal transmission and permit execution of the assignment of the priority with respect to a large number of service requests in a short period of time.

SUMMARY OF THE INVENTION

According to the invention, the above object is achieved by a priority assignment circuit which receives service request signals and comprises a plurality of service enable signal transmission units for transmitting a service enable signal in accordance with a priority determined by priority signals. Such a circuit is provided with service enable signal bypassing circuits each provided for a predetermined number of service enable signal transmission units to bypass the service enable signal if none of the service request units covered by it is providing a service request signal.

BRIEF DESCRIPTION OF THE DRAWINGS

This invention can be more fully understood from the following detailed description when taken in conjunction with the accompanying drawings, in which:

FIG. 7 is a timing chart illustrating the operation sequence of the circuit shown in FIGS. 6A to 6D.

DESCRIPTION OF THE INVENTION

Figure 1:
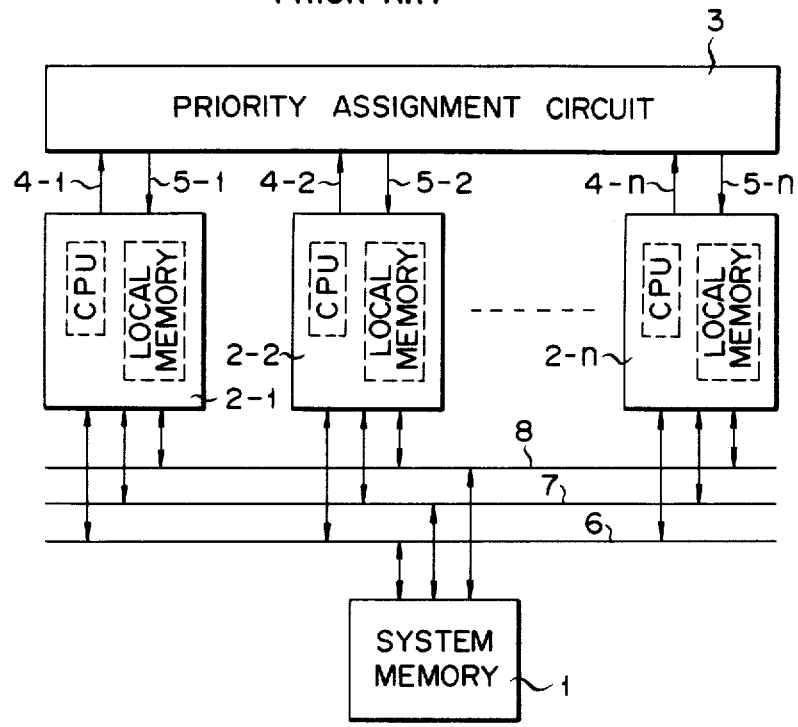
FIG. 1 is a block circuit diagram showing a prior art multi-processor system having a priority assignment circuit.
Figure 2:
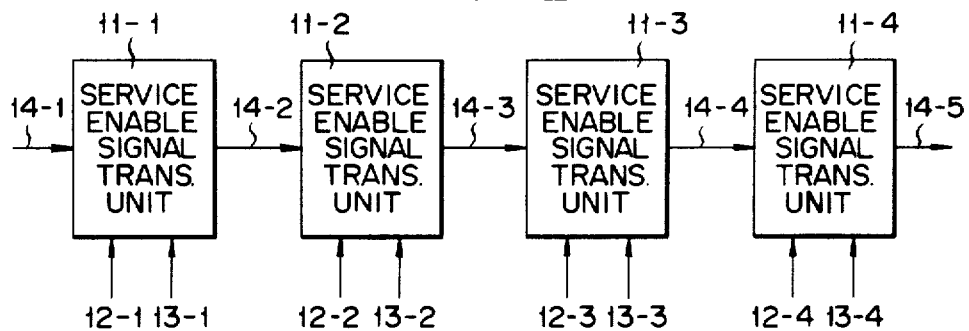
FIG. 2 is a block circuit diagram showing an essential part of the priority assignment circuit in the prior-art multi-processor system.
Figure 3:
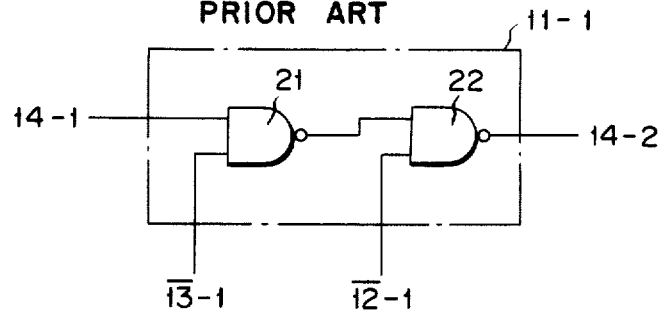
FIG. 3 is a block circuit diagram showing the internal construction of the service enable signal transmission unit shown in FIG. 2.
Figure 4:
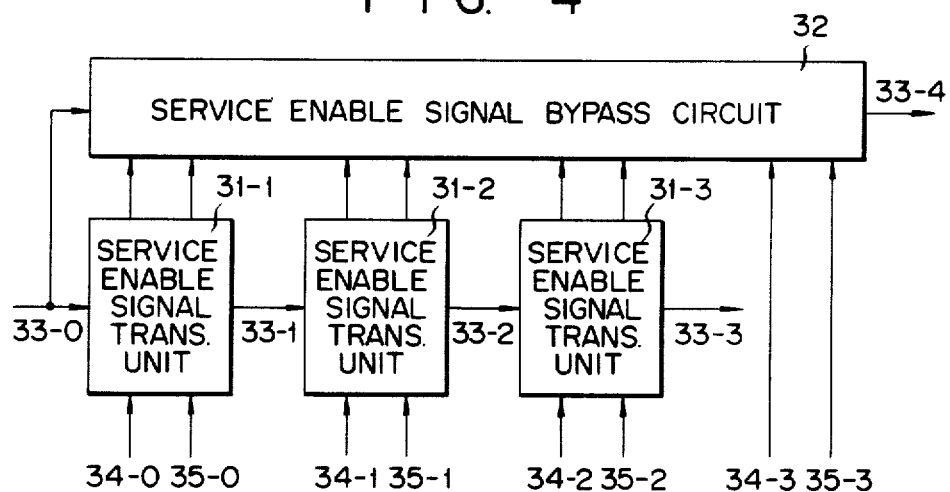
FIG. 4 is a block circuit diagram showing an embodiment of the priority assignment circuit according to the invention.

Referring now to FIG. 4, which shows an embodiment of the invention, there is shown a service enable signal bypassing circuit 32 which is provided for a plurality (in this case three) of service enable signal transmission units 31-1, 31-2 and 31-3. The service enable signal 33-0 is supplied to the first stage transmission unit 31-1 and also to the bypassing circuit 32.

If a service request signal 34-0 supplied to the transmission unit 31-1 is "0", the service enable signal 33-0 is transmitted from the unit 31-1 as a service enable signal 33-1 to the next stage transmission unit 31-2. If a service request signal 34-1 to the transmission unit 31-2 is "0", the signal 33-1 is transmitted as a service enable signal 33-2 to the third stage transmission unit 31-3.

If a service request signal 34-2 to the transmission unit 31-3 is "1", the signal 33-2 is not transmitted as service enable signal 33-3 to the following transmission unit. If the service request signal 34-2 is "0", the service enable signal 33-0 is bypassed through the bypassing circuit 32 and provided therefrom as a service enable signal 33-4 for the next transmission unit group. It will be seen that in this case the enable signal 33-0 can reach the following transmission unit far sooner than the case when it is transmitted through the units 31-1, 31-2 and 31-3. By serially connecting a plurality of circuits each having the above construction, including a predetermined number of service enable signal transmission units and a service enable signal bypassing circuit, a serial priority technique similar to the well-known daisy chain system can be established, and the period of transmission of the service enable signal can be reduced. In addition, by arranging such a system to permit the lowest priority service enable signal in the serial prority technique to be fed back as the highest priority signal, a ring-connected priority assignment circuit can be realized.

Figure 5:
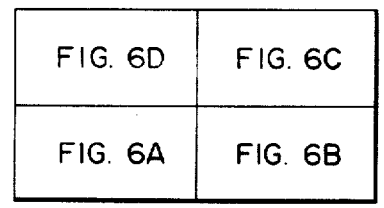
FIG. 5 shows the connecting relation of circuits shown in FIGS. 6A to 6D to one another.

FIGS. 6A to 6D show a circuit diagram of such a ring-connected priority assignment circuit embodying the invention, with FIG. 5 showing the connecting relation of the circuits shown in FIGS. 6A to 6D to one another. This embodiment effects priority assignment to sixteen received service request signals. The sixteen service request signals are divided into four groups each of four signals, and service enable signal bypassing circuits 41, 42, 43 and 44 are provided each for each service request signal group. The individual bypassing circuits each providing for 4 service request signals have substantially the same construction, so only one of these bypassing circuits, namely the circuit shown in FIG. 6A, will be described in detail.

Figure 6A:
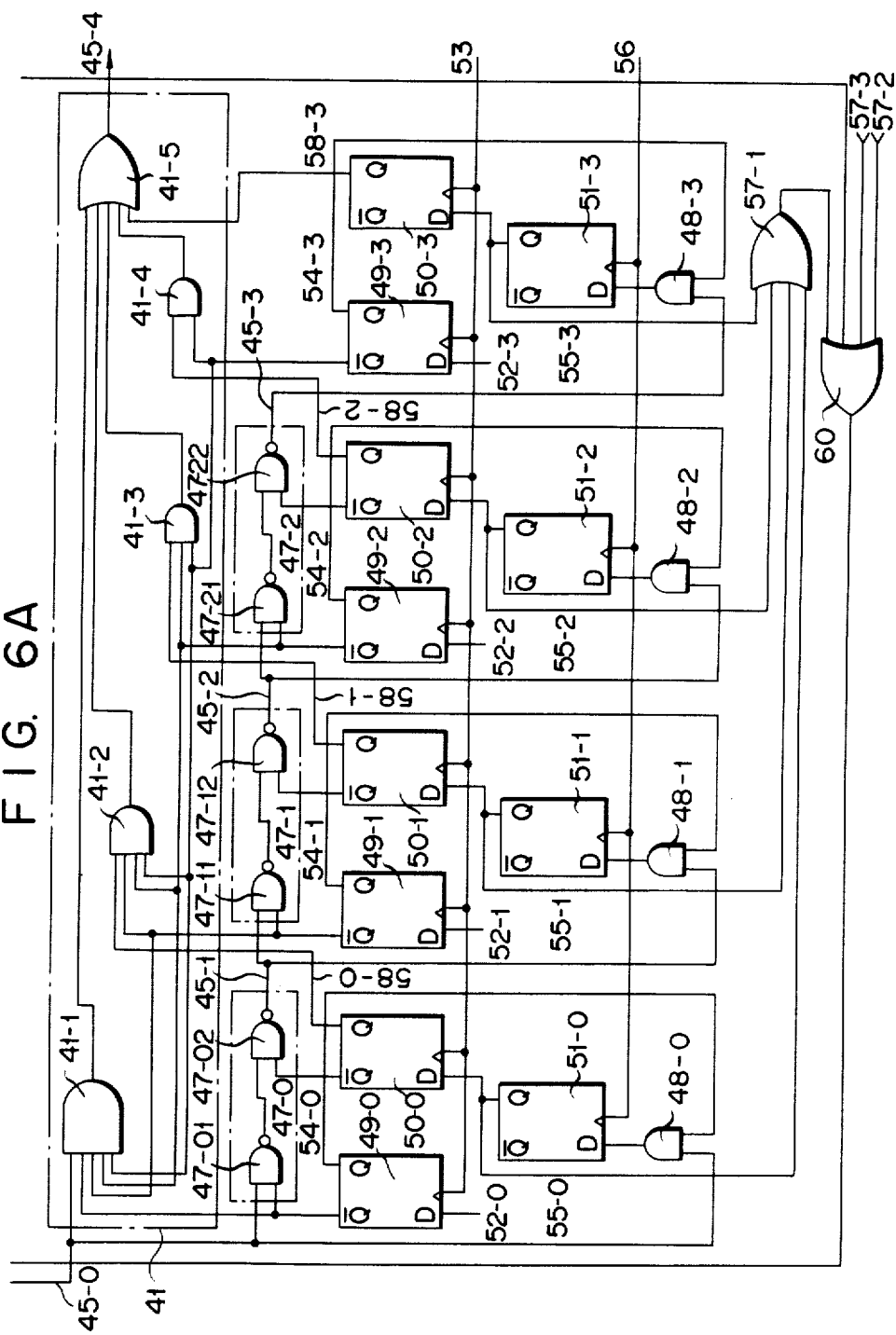
FIGS. 6A to 6D represent a schematic of a specific circuit construction of the embodiment of FIG. 4.

Referring to FIG. 6A, a bypassing circuit 41 includes four AND gates 41-1, 41-2, 41-3 and 41-4 and an OR gate 41-5, with the outputs of the four AND gates 41-1, 41-2, 41-3 and 41-4 all being coupled to the input of the OR gate 41-5.

A first stage service enable signal transmission unit 47-0 is constituted by two NAND gate stages 47-01 and 47-02. The aforementioned service enable signal 45-0 is coupled to one of two input terminals of the NAND gate 47-01 and also to one of two input terminals of an AND gate 48-0.

In addition to the AND gate 48-0, three flip-flops 49-0, 50-0 and 51-0 are provided for the transmission unit 47-0 as corresponding elements thereto. The flip-flop 49-0 is responsive to a service request, that is, a service request flag 52-0 is supplied from a service request unit to its D input terminal. When a clock signal 53 is impressed upon it, the flip-flop 49-0 is set to produce a service request signal $\overline{54}$-0 from its Q output terminal while also producing an inverted service request signal 54-0 from its $\overline{Q}$ output terminal. The inverted service request signal $\overline{54}$-0 is coupled to the other input terminal of the NAND gate 47-01 and also to another input terminal of the AND gate 41-1 in the bypassing circuit 41, while the service request signal 54-0 is coupled to the other terminal of the AND gate 48-0.

The output of the AND gate 48-0 is coupled to the flip-flop 51-0, which is provided for service execution, at its D input terminal, whereupon the flip-flop 51-0 produces a service execution signal 55-0 from its Q output terminal. When a clock signal 56 is impressed upon it, the flip-flop 51-0 is set to produce from its Q output terminal the service execution signal 55-0, which is coupled to the D input terminal of the flip-flop 50-0, a priority assignment flip-flop, and also to an input terminal of an OR gate 57-1. The flip-flop 50-0, which receives the service execution signal 55-0 at its D input terminal, is set by the clock 53 to produce from its Q output terminal a priority signal 58-0. Priority signal 58-0 is coupled to an input terminal of the AND gate 41-2 in the bypassing circuit 41. The $\overline{Q}$ output from the flip-flop 50-0 is coupled as an inverted priority signal 58-0 to one of two input terminals of the NAND gate 47-02, which receives at its other input terminal the output of the NAND gate 47-01.

The output of the service enable transmission unit 47-0 is coupled to one of two input terminals of a NAND gate 47-11 in a following stage transmission unit 47-1 and also to one of two input terminals of an AND gate 48-1. The output of the NAND gate 47-11 is coupled to one of two input terminals of a NAND gate 47-12. For the transmission unit 47-1, like the transmission unit 47-0, three flip-flops 49-1, 50-1 and 51-1 as well as the AND gate 48-1 are provided as corresponding elements to it. These elements are connected in the same manner as for the transmission unit 47-0.

The output of the stage transmission unit 47-1 is coupled to one of two input terminals of a NAND gate 47-21 in a following transmission unit 47-2 and also to one of two input terminals of an AND gate 48-2, and the output of a NAND gate 47-22 is coupled to one of two input terminals of an AND gate 48-3. The AND gate 41-1 in the bypassing circuit 41 receives, in addition to the service enable signal 45-0 mentioned above, inverted service sequest signals $\overline{54}$-0, $\overline{54}$-1, $\overline{54}$-2 and $\overline{54}$-3 from $\overline{Q}$ output terminals of the flip-flops 49-0, 49-1, 49-2 and 49-3. If none of service request flags 52-0 to 52-3 supplied from any service request unit to any of the flip-flops 49-0 to 49-3 at the D input terminal thereof is effective, all the flip-flops 49-0 to 49-3 supply a "1" output from their $\overline{Q}$ output terminals. In this case, the service enable signal 45-0 is passed through the AND gate 41-1 and transmitted from the OR gate 41-5 as a service enable signal 45-4 to the input terminal of the next bypassing circuit 42. Thus, it is transmitted as the signal 45-4 without agency of the three transmission unit stages 47-0 to 47-2.

If the service request flag 52-0 at the D input terminal of the flip-flop 49-0 is effective, the flip-flop 49-0 is set to supply the service request signal to one input terminal of the AND gate 48-0. As a result, the service enable signal 45-0 is passed through the AND gate 48-0 to set the flip-flop 51-0, so that this flip-flop 51-0 produces from its Q output terminal a service execution signal 55-0. That is the first operation cycle in which services are executed for the service request unit corresponding to the service request flag 52-0. In the next operation cycle, the flip-flop 50-0 is set by the service execution signal 55-0. As a result, an utmost priority is given to a service request unit next to the unit having executed service in the preceding operation cycle. Consequently, the priority signal 58-0 is coupled to an input terminal of the AND gate 41-2 in the bypassing circuit 41. At this time, if none of the other service request flags 51-2, 52-2 and 52-3 is effective, the priority signal 58-0 is passed through the AND gate 41-2 and transmitted as the service enable signal from the OR gate 41-5.

If one or more of the three service request flags 52-1, 52-2 and 52-3 is or are "1", the corresponding one or ones of the flip-flops 49-1 to 49-3 is or are set to produce $\overline{Q}$ output of "0". In this case a "0" output is obtained from the AND gate 41-2. For instance, if the service request flag 52-2 exists, the flip-flop 49-2 is set to produce service request signal 54-2 coupled to an AND gate 48-2. Since at this time a service enable signal 45-2 from the preceding stage transmission unit 47-1 is being coupled to the AND gate 48-2, the flip-flop 51-2 is set in response to the output of the AND gate 48-2. As a result, a service execution signal 55-2 is sent from the Q output terminal thereof to set a flip-flop 50-2 in the next operation cycle. Hence, the highest priority is given to a service request unit corresponding to the service request flag 52-3.

If all the service request flags 52-0 to 52-3 are "1", all the $\overline{Q}$ outputs of the flip-flops 49-0 to 49-3 are "0", so that none of the AND gates 41-1 to 41-4 are opened. In this case, the flip-flop 50-3 is set to send a priority signal 58-3 to the next stage through the OR gate 41-5 as a service enable signal. This occurs only when a service is executed by a service request unit corresponding to the service request flag 52-3 in the preceding operation cycle, i.e., only when the flip-flop 51-3 has been set. As has been shown, the service enable signal 45-0 or priority signals 58-0 to 58-3 are either transmitted through one of the AND gates 41-1 to 41-4 in the bypassing circuit 41 to the next bypassing circuit 42 or not through these AND gates depending upon the state of the service request flags. At this time, the three highest service enable transmission units 47-0 to 47-2 are bypassed.

Figure 6B:
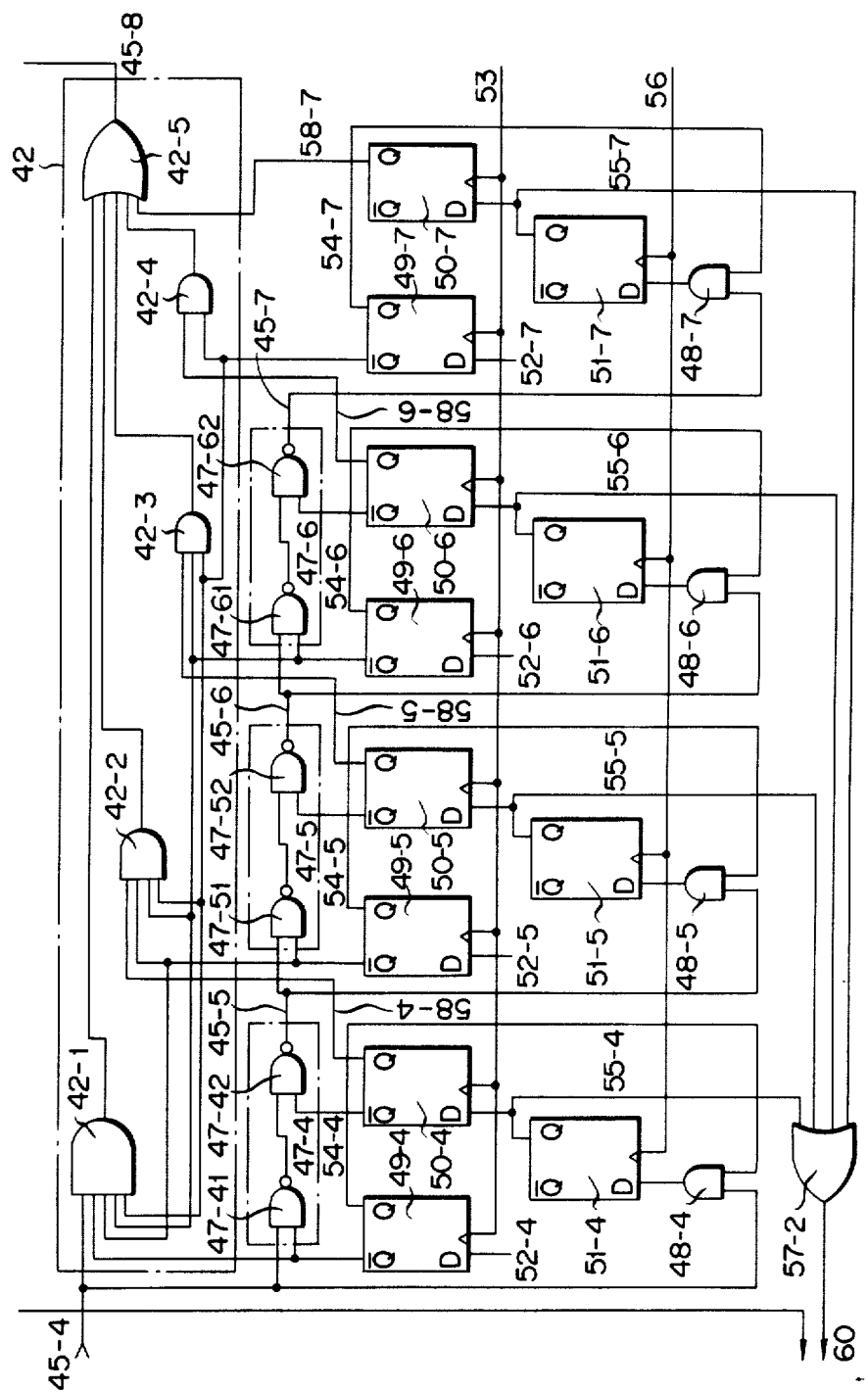
Figure 6C:
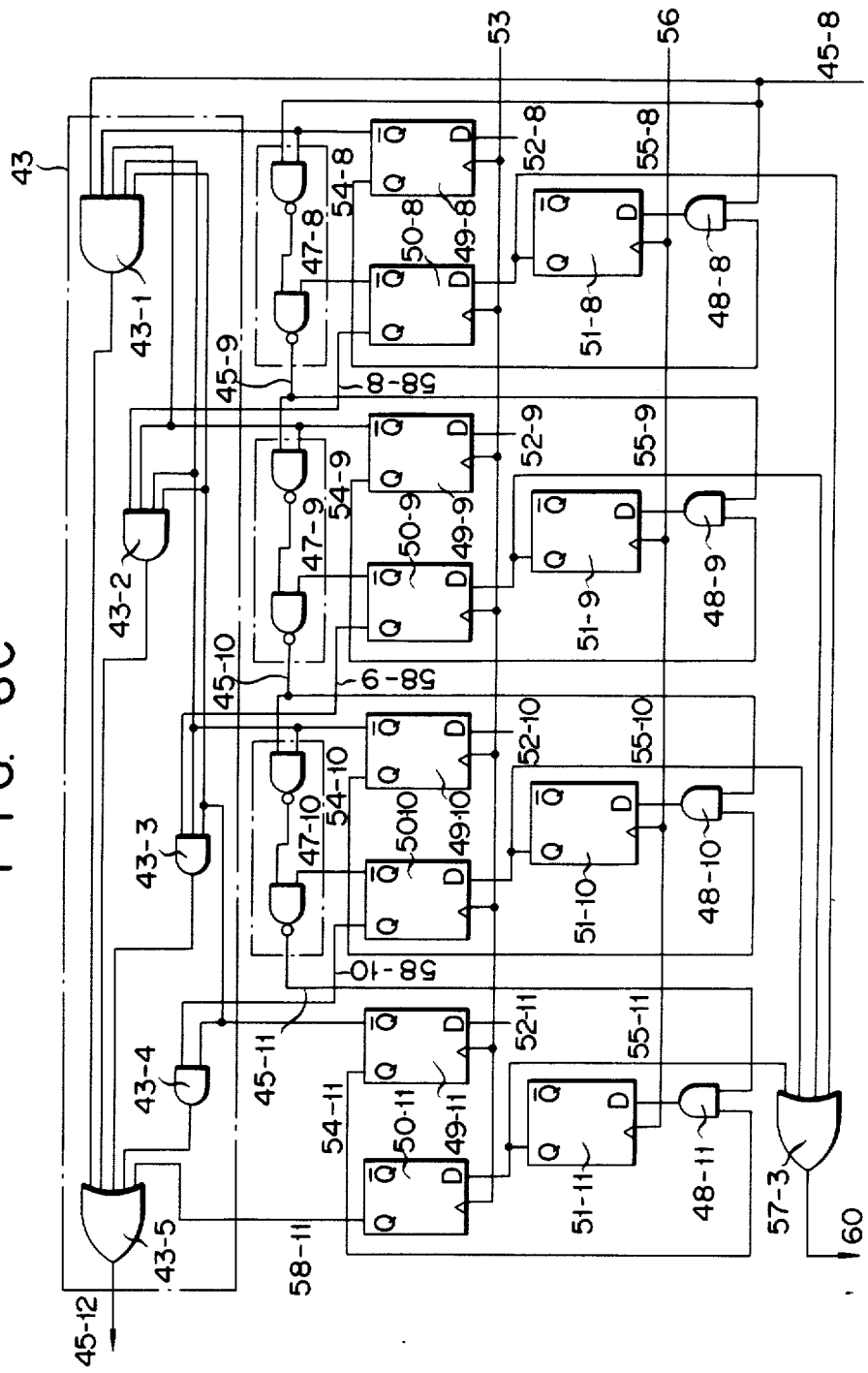
Figure 6D:
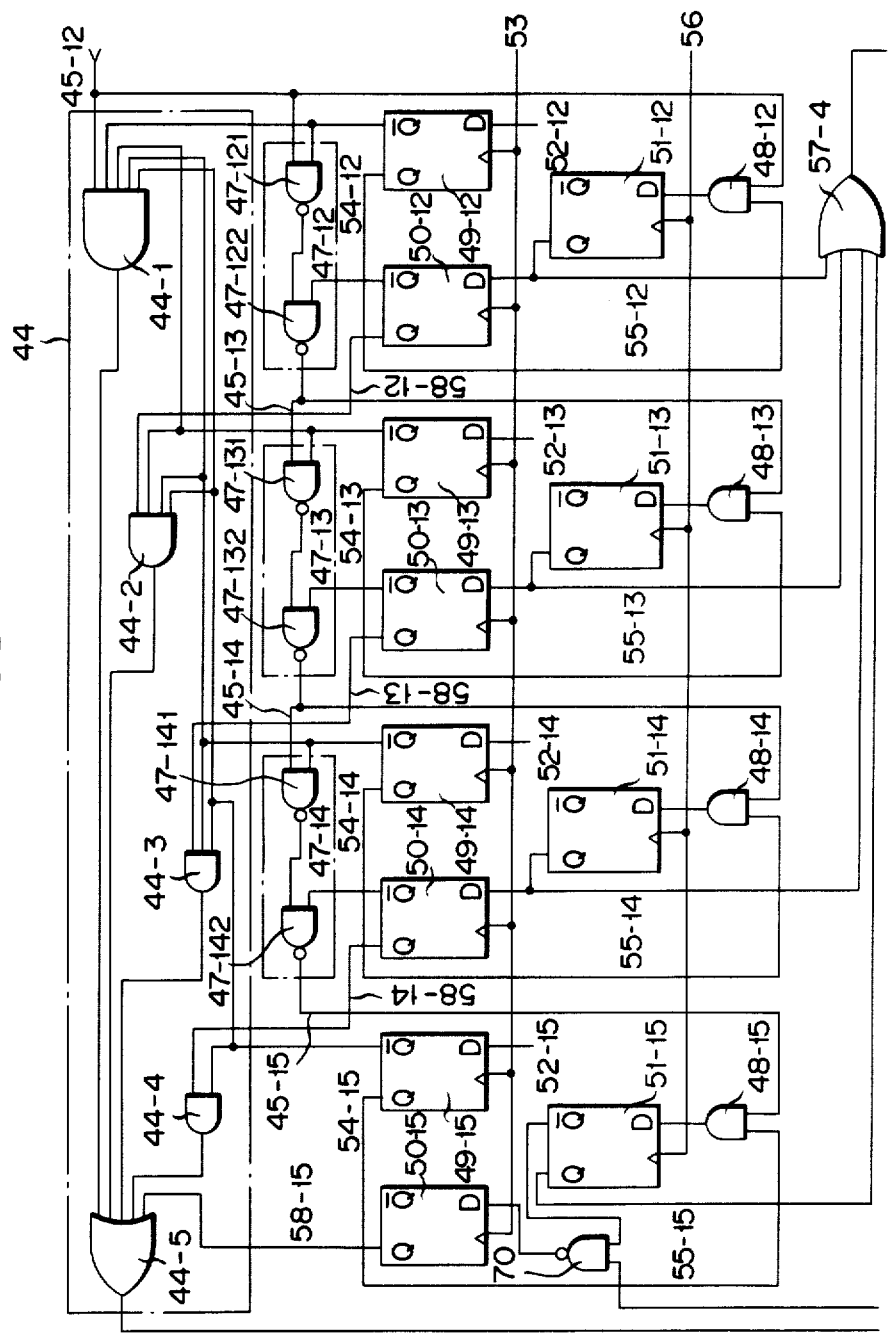

The Q outputs of the flip-flops 51-0 to 51-3 are coupled through the OR gate 57 to an OR gate 60, and thence supplied to one of two input terminals of a NAND gate 70 shown in FIG. 6D. This ensures that a priority in the next operation cycle is given to a service request unit corresponding to the service request flag 52-0 in the case the 16 service request flags are all "0".

The service enable signal 45-4 supplied from the OR gate 41-5 is coupled to an AND gate 42-1 in the next bypassing circuit 42, a NAND gate 47-41 in a transmission unit 47-4 and an AND gate 48-4. The bypassing circuit 42 includes four AND gates 42-1, 42-2, 42-3 and 42-4 and an OR gate 42-5, and it is combined with three stage service enable signal transmission units 47-4, 47-5 and 47-6. For the transmission units 47-4 to 47-6, AND gates 48-4 to 48-6 and flip-flops 49-4 to 49-6, 50-4 to 50-6 and 51-4 to 51-6 are correspondingly provided. Since the construction of the circuit part shown in FIG. 6B is the same as that shown in FIG. 6A, its construction and operation are not described any further. The service request flip-flops 49-4 to 49-7 are responsive to respective service request flags 52-4 to 52-7 and produce service request signals 54-4 to 54-7 when they receive these flags. As a result, one of the flip-flops 51-4 to 51-7 is set only when it receives the service enable signal.

The flip-flops 51-4 to 51-7 produce from their Q output terminals respective service execution signals 55-4 to 55-7 which are coupled to the D input terminals of the priority flip-flops 50-4 to 50-7 to determine the highest priority in the next operation cycle. The service execution signals 55-4 to 55-7 are also supplied to the OR gate 60 through an OR gate 57-2.

The service enable signal 45-8 that is produced from the bypassing circuit 42 in FIG. 6B is coupled to an input terminal of an AND gate 43-1 in the bypassing circuit 43 shown in FIG. 6C. This bypassing circuit 43 again includes four AND gates 43-1, 43-2, 43-3 and 43-4 and an OR gate 43-5 and is combined with three stage service enable signal transmission units 47-8, 47-9 and 47-10.

For the transmission units 47-8 to 47-10, AND gates 48-8 to 48-10, flip-flops 49-8 to 49-10 responsive to service requests, flip-flops 50-8 to 50-10 for producing priority signals and flip-flops 51-8 to 51-10 for producing service execution signals are provided as corresponding circuits thereof. Further, an AND gate 48-11 and three flip-flops 49-11, 50-11 and 51-11 are respectively provided for the bypassing circuit 43. The service enable signal 45-12 that is obtained from the output terminal of the bypassing circuit 43 is coupled to an input terminal of an AND gate 44-1 in the bypassing circuit 44 shown in FIG. 6D. Also, the service execution signals 55-8 to 55-11 from the respective flip-flops 51-8 to 51-11 are supplied through an OR gate 57-3 to the OR gate 60 shown in FIG. 6A.

Inn FIG. 6D, the bypassing circuit 44 again includes four AND gates 44-1, 44-2, 44-3 and 44-4 and an OR gate 44-5, and the output of the OR gate 44-5 is fed as the service enable signal 45-0 back to the input side of the bypassing circuit 41 in FIG. 6A. The bypassing circuit 44 is combined with three-stage transmission units 47-12, 47-13 and 47-14. For the transmission units 47-12 to 47-14, AND gates 48-12 to 48-14, service request flip-flops 49-12 to 49-14, priority signal generation flip-flops 50-12 to 50-14 and service execution signal generation flip-flops 51-12 to 51-14 are respectively provided. Further, an AND gate 48-15 and three flip-flops 49-15, 50-15 and 51-15 are provided. The service execution signals 55-12 to 55-15 from the respective service execution signal generation flip-flops 51-12 to 51-15 are supplied through an OR gate 57-4 to the OR gate 60.

The service execution signals from the OR gates 57-1 to 57-4, which are provided for the respective bypassing circuits 41 to 44, are fed through the OR gate 60 as one input to the NAND gate 70 shown in FIG. 6D. When both the service execution signal output of the OR gate 60 and the $\overline{Q}$ output of the service execution flip-flop 51-15 are not "1", the NAND gate 70 provides a "1" output to set the priority signal generation flip-flop 50-15, and the priority signal is coupled therefrom to the OR gate 44-5.

Now, the operation of the whole construction of the embodiment shown in FIGS. 6A to 6D will be described with reference to the timing charts of FIG. 7. When the clock signal 56 shown in (e) in FIG. 7 is "1" in the M-th clock period, the flip-flops 51-0 to 51-15 are all cleared if all the service request signals 54-n (n being 0, 1, 2, ..., 15) are "0". In this case, the service execution signals 55-n (n being 0, 1, 2, ..., 15) are all "0", and the outputs of the OR gates 57-1 to 57-4, to each of which four service execution signals 55-n are coupled, are all "0". Thus, the output of the OR gate 60 to which the outputs of the OR gates 57-1 to 57-4 are coupled is "0", and the output of the NAND gate 70 is consequently "1".

Then, when the clock signal 53 shown in (b) in FIG. 7 becomes "1" in the (m+1)-th clock period after the change of the clock signal 56 shown in (e) in FIG. 7 to "0" in the m-th clock period, only the flip-flop 50-15 among the flip-flop 50-0 to 50-15 is set. Since the priority signal 58-15 is "1" at this time as shown in (d) in FIG. 7, the OR gate 44-5 in the bypassing circuit 44 provides output of "1". When the clock signal 53 shown in (b) in FIG. 7 becomes "1" in this period, in addition to the alteration of the state of the priority signal generation flip-flops 50-0 to 50-15, the state of the service request sensitive flip-flops 49-0 to 49-15 is altered according to the service request flags 52-0 to 52-15 as shown in (a) in FIG. 7.

Now, the case when three service request signals 52-7, 52-11 and 52-15 are "1" while the other flags are all "0", will be taken. In this case, since the Q̄ outputs of the service request signal generation flip-flops 49-0 to 49-3 are "1" and the service enable signal 45-0 is "1", the AND gate 41-1 in the bypassing circuit 41 provides output of "1" and thus the OR gate 41-6 provides "1" output as the service enable signal 45-4. Also, since the service request flag 52-7 (FIG. 6B) provides an output of "1", the service request sensitive flip-flop 49-7 provides Q output of "0" and all the AND gates 42-1, 42-2, 42-3 and 42-4 in the bypassing circuit 42 provide "0" outputs. Thus, the OR gate 42-5 provides output of "0" as the service enable signal 45-8.

Further, since the Q outputs 58-8 to 58-11 from the priority signal generation flip-flops 50-8 to 50-11 (FIG. 6C) are all "0", the OR gate 43-5 in the bypassing circuit 42 provides output of "0" as the service enable signal 45-12. Meanwhile, since the service request flag 52-4 to 52-6 in the circuit part of FIG. 6B are all "0", the flip-flops 49-4 to 49-6 all provide Q output of "0" and Q̄ output of "1". Thus, the AND gate 47-41 in the transmission unit 47-4 provides "0" output, and the NAND gate 47-42 provides "1" output 45-5. Likewise, "1" outputs are provided as the service enable signals 45-6 and 45-7. Further, since the service enable signal 45-8 is "0" and the Q̄ outputs of the priority signal generation flip-flops 50-8 to 50-10 in the circuit part of FIG. 6C are all "1", "0" outputs are provided as the service enable signals 45-9 to 45-11. Thus, the service enable signals 45-n (n being 0, 1, 2, ..., 15) in the (m+1)-th clock period of the clocks 53 and 56 are determined as shown in Table 1 below.

TABLE 1

| n | 55-n | 54-n (= 52-n) | 58-n | 45-n | 55-n | 54-n | 58-n | 45-n | 55-n |
|---|------|---------------|------|------|------|------|------|------|------|
| 1 | 0 | 0 | 0 | 1 | 0 | 0 | 0 | 1 | 0 |
| 2 | 0 | 0 | 0 | 1 | 0 | 0 | 0 | 1 | 0 |
| 3 | 0 | 0 | 0 | 1 | 0 | 1 | 0 | 1 | 1 |
| 4 | 0 | 0 | 0 | 1 | 0 | 0 | 0 | 0 | 0 |
| 5 | 0 | 0 | 0 | 1 | 0 | 1 | 0 | 0 | 0 |
| 6 | 0 | 0 | 0 | 1 | 0 | 0 | 0 | 0 | 0 |
| 7 | 0 | 1 | 0 | 1 | 1 | 0 | 1 | 0 | 0 |
| 8 | 0 | 0 | 0 | 0 | 0 | 0 | 0 | 0 | 0 |
| 9 | 0 | 0 | 0 | 0 | 0 | 0 | 0 | 1 | 0 |
| 10 | 0 | 0 | 0 | 0 | 0 | 0 | 0 | 1 | 0 |
| 11 | 0 | 1 | 0 | 0 | 0 | 0 | 0 | 1 | 0 |
| 12 | 0 | 0 | 0 | 0 | 0 | 0 | 0 | 1 | 0 |
| 13 | 0 | 0 | 0 | 0 | 0 | 0 | 0 | 1 | 0 |
| 14 | 0 | 0 | 0 | 0 | 0 | 0 | 0 | 1 | 0 |
| 15 | 0 | 1 | 1 | 0 | 0 | 0 | 0 | 1 | 0 |
| clock period | m | | m + 1 | | | | m + 2 | | |

The above description has concerned with the operation taking place in the (m+1)-th clock period under the assumption that the flip-flops 51-0 to 51-15 are all cleared in the preceding m-th period. Also, as will be noted from FIG. 7, the periods of the clock 53 are slightly advanced with respect to the periods of the clock 56, that is, the clock 53 which has bearing upon the service request signals 54-n, priority signals 58-n and service enable signals 45-n appears in each period prior to the clock 56 having bearing upon the service execution signals 55-n.

When the service enable signals 45-n in the (m+1)-th clock period are determined, the service execution signals 55-n are also determined. This is because the service execution signals 55-n are produced when the outputs of the AND gates 48-0 to 48-15, which receive the signals 45-n, and 54-n are latched in the service execution signal generation flip-flops 51-0 to 51-15 under the control of the clock 56. In the (m+1)-th clock period of the service execution signals 55-n only the signal 55-7 is "1" and the other signals 55-0 to 55-6 and 55-8 to 55-15 are all "0". Thus, of the service request flags 52-7, 52-11 and 52-15 that are changed to "1", the flag 52-7 is given priority in this period to permit execution of service with respect to the apparatus providing this service request flag.

When the (m+2)-th clock period sets in, the priority signal generation flip-flop 50-7 corresponding to the flag 52-7 for which service has been executed in the preceding period is set to produce "1" as its output 58-7. Thus, the service enable signals 45-n up to the signal 45-2 which are highest in the priority among the available signals for which the service request flag 52-n is "1" are changed to "1" while the others are all "0" as shown in Table 1. Consequently, in the (m+2)-th clock period priority is given to the service request flag 52-2. In other words, of the service execution signals 55-n, the signal 55-2 is changed to "1" while the others are all "0". The service execution signal 55-n in force is sent forth from the priority assignment circuit to a service supply unit, whereby this unit executes service with respect to the unit requesting the service. When the service execution is ended, the service request unit clears the prevailing service request flag 52-n.

In this embodiment, the greatest delay time required for the transmission of the service enable signal 45-$n$ is, in the case of transmission through three transmission units each including two NAND gate stages and three bypass circuits and each including an AND gate and an OR gate, a total of $2\times3+2\times3=12$ gate stages. With the corresponding prior art priority assignment circuit without any bypassing circuit, a delay time corresponding to 30 gate stages is involved in the worst case as mentioned earlier. Thus, with this embodiment, the largest delay time involved in the transmission of the service enable signal can be reduced to be less than one half of the maximum delay time in the prior art. For this reason, the priority assignment to a large number of service requests can be effected in a short period of time.

While in the above embodiment the bypassing circuits are provided each for four service request signal lines, in general a bypassing circuit may be provided for any desired number of service request signal lines. Also, the number of lines to be covered by each bypassing circuit may be suitably selected by taking the number of gates that can be added and the required processing speed into considerations.

Figure 8:
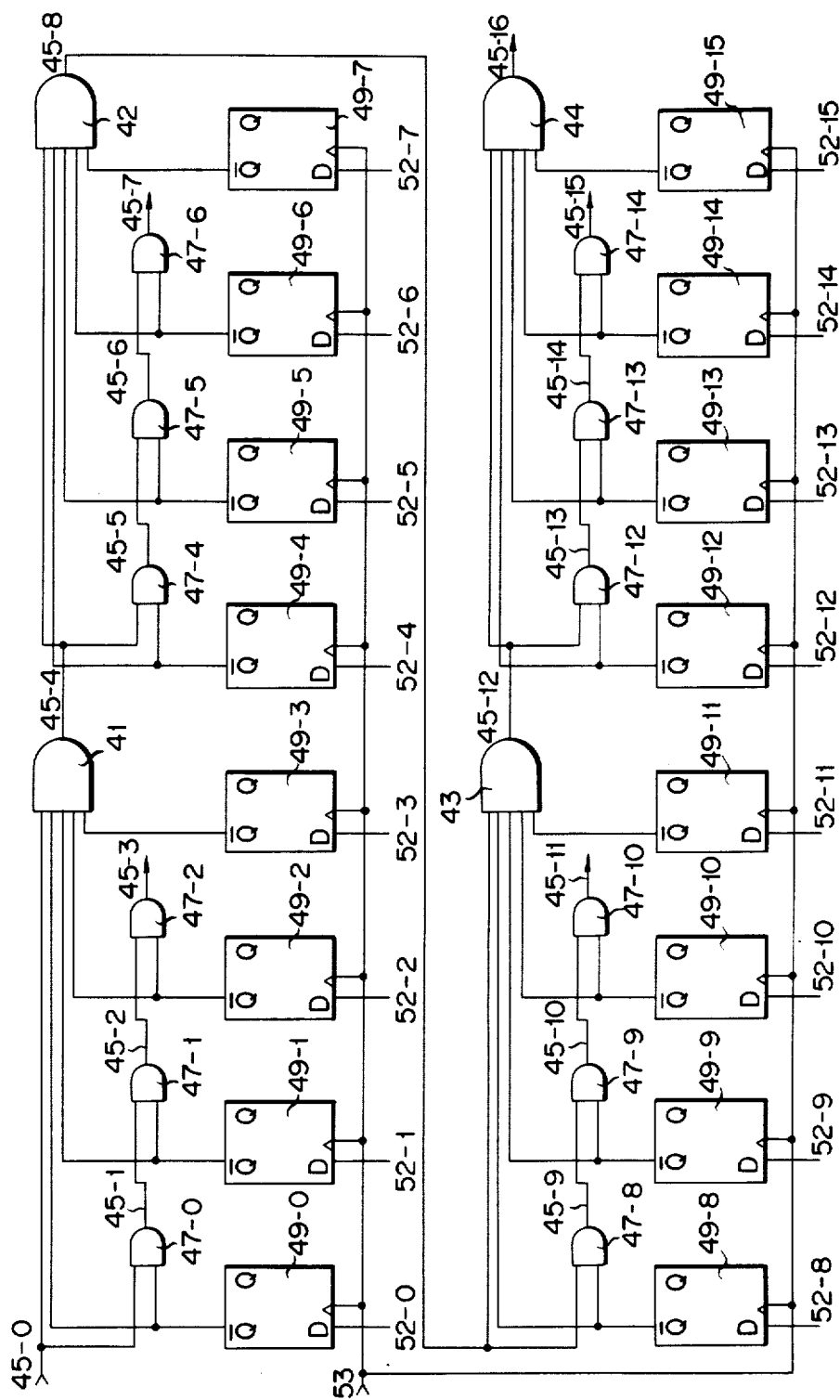
FIG. 8 is a schematic showing a modification of the embodiment shown in FIGS. 6A to 6D.

The above embodiment of FIGS. 6A to 6D, in which four bypassing circuits 41 to 44 have been used to form a ring-connected priority assignment circuit, may be modified to construct a serial priority assignment circuit. FIG. 8 shows an example of such serial priority assignment circuit. In FIG. 8, like parts as those in FIGS. 6A to 6D are designated by like reference figures. The component elements in the embodiment of FIG. 8 are all shown in FIGS. 6A to 6D, so the description of its construction is not given here.

Referring to FIG. 8, the highest priority level service enable signal 45-0 is supplied to the input terminals of AND gates 41 and 47-0. When none of service request flags 52-0 to 52-15 are impressed upon the D input terminal of any of flip-flops 49-0 to 49-15, the $\bar{Q}$ outputs of all flip-flops 49-0 to 49-15 are "1". In this case, the service enable signal 45-0 is thus bypassed through AND gates 41 to 44 and obtained as a service enable signal 45-16. Thus, in contrast to the prior art, in which case a delay time by 16 gate stages may be involved in the worst case of transmission of the service enable signal, with this embodiment only a delay time through four AND gate stages is necessary. Further, in case when only the flag 52-2, for instance, is provided, service enable signals 45-3 to 45-16 are "0". Thus, the service enable signals are not transmitted from the service request unit corresponding to the service request flag 52-2 to the following units. The other part of the operation of the embodiment of FIG. 8 is the same as has been described earlier in connection with the circuit of FIGS. 6A to 6D and thus requires no further description.

What is claimed is:

1. A circuit for determining priorities among a plurality of service requesting units having different service priority levels and being connected to a data processing unit, each of said service requesting units indicating its desire for access to said data processing unit by using a different service request flag, said circuit comprising:

at least one service enable unit coupled to said plurality of service requesting units, each service enable unit having an input terminal coupled to a service enable input signal and an output terminal producing a service enable output signal, said service enable input signal indicating whether there is any outstanding request for access to said data processing unit which has a higher service priority level than that of any of said plurality of service requesting units coupled to said service enable unit, and said service enable output signal indicating whether any of said service requesting units coupled to said service enable unit desires access to said data processing unit or whether said service enable input signal is indicating an outstanding request for access to said data processing unit which has a higher service priority level than that of any said service requesting units, each said service enable unit including (a) a service enable bypassing circuit including a plurality of signal bypassing AND gates each corresponding to a different service priority level, and an OR gate having inputs connected to the output of each of said signal bypassing AND gates and having an output connected to said service enable unit output terminal, the signal bypassing AND gate corresponding to the highest service priority level having an input coupled to said service enable unit input terminal, (b) a plurality of serially-connected service enable signal transmission units each corresponding to a different service priority level and each of said service enable transmission units including first and second NAND gates with two input terminals and an output, the output of the first NAND gate in each of said signal transmission units being coupled to a first input of the second NAND gate in that signal transmission unit and the output of the second NAND gate of each of said transmission units, except for said transmission unit corresponding to the lowest service priority level, being connected to a first input terminal of the first NAND gate in the transmission unit having the next lowest service priority level, the first NAND gate of the service enable signal transmission unit corresponding to the highest service priority level having a first input coupled to said service enable unit input terminal, (c) a plurality of service request flip-flops each corresponding to a different signal bypassing AND gate and to the service priority level of that signal bypassing AND gate, each of said service request flip-flops having a set terminal coupled to a different one of said service request units to receive from that unit a service request flag and each of said service request flip-flops also having first and second complementary output terminals, said first output terminal of each service request flip-flop being connected to an input of the corresponding signal bypassing AND gate, and, except for said service request flip-flop corresponding to the lowest signal priority level, also being connected to a second input terminal of the first NAND gate in a different one of said service enable signal transmission units, said second output terminal of each of said service request flip-flops providing a service request signal, (d) a plurality of service request signal transmitting AND gates each corresponding to a different service request flip-flop and to the service priority level of that service request flip-flop, said service request signal transmitting AND gates each having a first input coupled either to the output of the adjacent service enable signal transmission unit or to the output of an adjacent service enable bypassing circuit, a second input terminal coupled to the service request signal of the corresponding service request flip-flop, and an output terminal, (e) a plurality of service execution flip-flops each corresponding to a different service request signal transmitting AND gate and to the service priority level of that transmitting AND gate, each said service execution flip-flops having a set terminal connected to the output terminal of said corresponding service request signal transmitting AND gate and an output terminal providing a service execution signal, and (f) a plurality of priority assignment flip-flops each corresponding to a different service execution flip-flop and to the service priority level of that service execution flip-flop, each of said priority assignment flip-flops having a set terminal coupled to the service execution signal from the corresponding service execution flip-flop and each of said priority assignment flip-flops having third and fourth complementary output terminals, said third output terminal being connected to a second input terminal of the second NAND gate in a different service enable signal transmission unit, and said fourth output terminal providing a priority signal, the priority signal of each of said priority assignment flip-flops, except the priority assignment flip-flop having the lowest priority, being connected to said signal bypassing AND gate having the next lower priority level.

2. The circuit of claim 1 comprising a plurality of service enable signal bypassing units connected in a daisy-chain fashion such that the service enable input signal of each said service enable signal bypassing unit is coupled to the service enable output signal from a different service enable signal by-passing unit.

3. The circuit of claim 1 including a plurality of service enable signal bypassing units serially-connected such that, except for a first service enable signal bypassing unit, the service enable input signal of each said signal bypassing unit is connected to the service enable output signal of a different signal bypassing unit.

4. The circuit of claim 1 wherein;
said signal bypassing AND gate corresponding to the highest service priority level includes a five-input AND gate having first to fifth input terminals, said first input terminal being connected to receive said service enable input signal;
wherein said signal bypassing AND gates in said service enable signal bypassing circuit also include a four-input signal bypassing AND gate having first to fourth input terminals, a three-input signal bypassing AND gate having first to third input terminals and a two-input signal bypassing AND gate having first and second input terminals;

wherein said OR gate includes first to fifth input terminals, said first to fourth input terminals receiving the outputs of said five-input, four-input, three-input and two-input signal bypassing AND gates, respectively;

wherein said service enable signal bypassing unit also includes first to third service enable signal transmission units, first to fourth service request flip-flops, first to fourth service execution flip-flops, first to fourth priority assignment flip-flop and first to fourth service request signal transmitting AND gates and wherein said first to fourth service request flip-flops are connected to deliver first to fourth $\bar{Q}$ and Q complementary outputs, the second to fifth input terminals of said five-input AND gate and connected to receive said first to fourth $\bar{Q}$ outputs, said second to fourth input terminals of said four-input AND gate are connected to receive said second to fourth $\bar{Q}$ outputs, said second and third input terminals of said three-input AND gate are connected to receive said third and fourth $\bar{Q}$ outputs and said second input terminal of said two-input AND gate is connected to receive said fourth $\bar{Q}$ output, said second input terminals of said first NAND gates of said first to third service enable signal transmission units are connected to receive said first to third $\bar{Q}$ outputs, respectively, said first to fourth Q outputs of said service request flip-flops are connected to the second input terminals of the first to fourth service request signal transmitting AND gates, said first to third priority assignment flip-flops have Q and $\bar{Q}$ output terminals for delivering first to third Q and $\bar{Q}$ outputs, said first to third $\bar{Q}$ outputs being supplied to each of second input terminals of the second NAND gates, the first to third Q outputs being supplied to the first input terminals of said second to fourth bypassing AND gates, and said fourth service request flip-flop has a Q output terminal for delivering a Q output supplied to said fifth input terminal of said OR gate in said bypassing circuit.

5. A circuit according to claim 1 also including first and second clock signals wherein said service request flip-flops and priority assignment flip-flops have D input terminals to which said service request flags are supplied and have clock terminals commonly coupled to said first clock signal, and said service execution flip-flops have D input terminals and clock terminals commonly coupled to said second clock signal.

* * * * *